United States Patent [19]
Bichler et al.

[11] Patent Number: 5,596,264
[45] Date of Patent: Jan. 21, 1997

[54] CIRCUIT CONFIGURATION FOR LIMITING THE OUTPUT VOLTAGE OF A CLOCKED VOLTAGE REGULATOR

[75] Inventors: Helmut Bichler, Graefelfing; Michael Herfurth, Gilching; Martin Feldtkeller, München; Michael Lenz, Zorneding, all of Germany

[73] Assignee: Siemens Aktiengesellschaft, Munich, Germany

[21] Appl. No.: 493,809

[22] Filed: Jun. 22, 1995

[30] Foreign Application Priority Data

Jun. 23, 1994 [DE] Germany ............ 44 22 066.9

[51] Int. Cl.$^6$ .................................................. G05F 1/56
[52] U.S. Cl. ................................. 323/284; 323/285
[58] Field of Search ................................. 323/282, 283, 323/284, 285

[56] References Cited

U.S. PATENT DOCUMENTS

| | | | |
|---|---|---|---|
| 4,837,495 | 6/1989 | Zansky | 323/222 |
| 5,359,281 | 10/1994 | Barrow et al. | 323/284 |
| 5,386,187 | 1/1995 | Bichler et al. | 323/282 X |
| 5,438,505 | 8/1995 | Cohen | 323/285 X |
| 5,471,130 | 11/1995 | Agiman | 323/284 X |

OTHER PUBLICATIONS

Elektronik 23/1993, pp. 86–89 (Nelson et al.) Bessere Schaltnetzteile durch Leistungsfaktor-Korrektor.
Siemens Components 31 (1993) Book 2, pp. 46–50.
L6560 by SGS–Thomson, pp. 1/10–9/10, Power factor corrector, Mar. 1994.
LT1249 by Linear Technology, pp. 1–7, Power factor corrector, Jul. 1993.

*Primary Examiner*—Peter S. Wong
*Assistant Examiner*—Y. J. Han
*Attorney, Agent, or Firm*—Herbert L. Lerner; Laurence A. Greenberg

[57] ABSTRACT

A circuit configuration for limiting an output voltage of a clocked voltage regulator includes a control unit receiving a direct voltage to be regulated and having an output for supplying an output voltage. A voltage regulating amplifier is constructed as an integrator, receives the output voltage and a reference voltage, and supplies an output signal. A current threshold generator detects a current intensity of the integrator and supplies an output signal. A multiplier multiplies the output signal of the current threshold generator by the output signal of the voltage regulating amplifier and a signal obtained from the direct voltage to be regulated and supplies an output signal. A current regulating amplifier receives the output signal of the multiplier and a signal obtained from the direct voltage to be regulated and supplies an output signal. A driver stage converts the output signal of the current regulating amplifier into a trigger signal for the control unit. A comparator detects an output voltage of the voltage regulating amplifier and furnishes a dominant shut-off signal to the control unit if a reference voltage is exceeded.

3 Claims, 1 Drawing Sheet

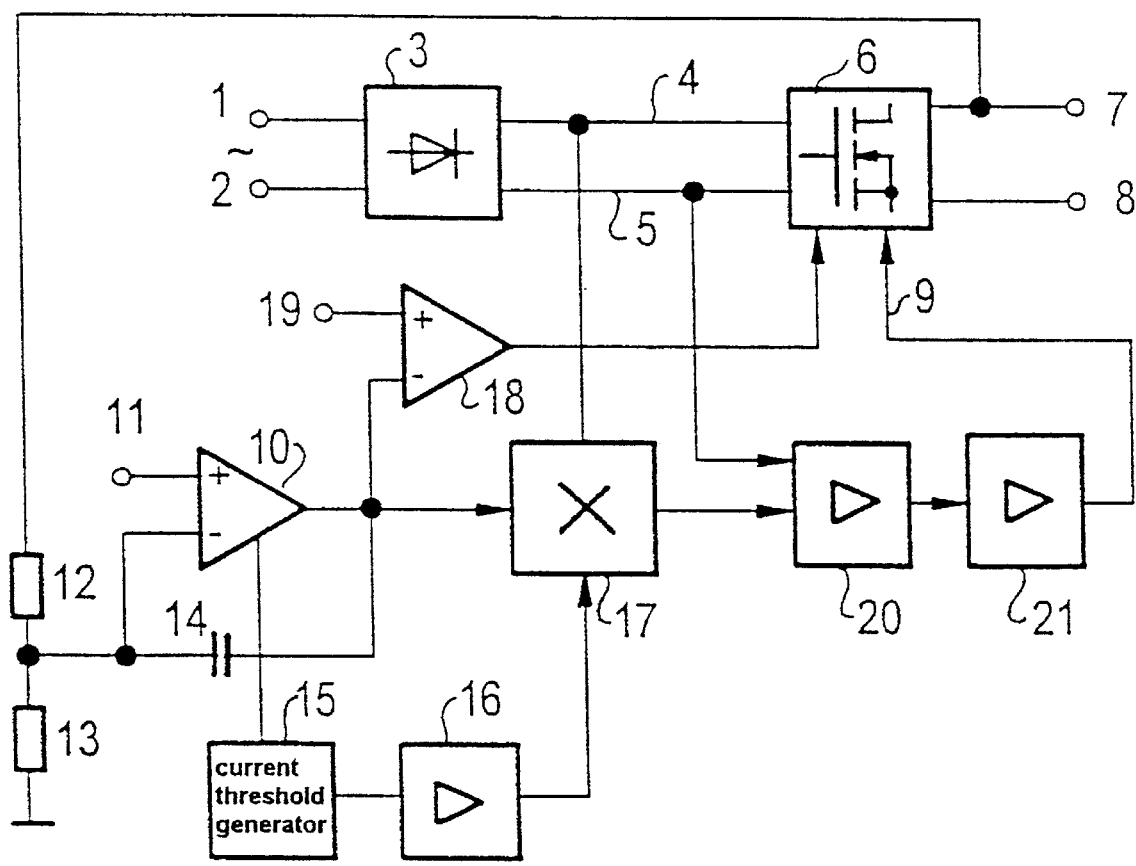

5,596,264

CIRCUIT CONFIGURATION FOR LIMITING THE OUTPUT VOLTAGE OF A CLOCKED VOLTAGE REGULATOR

BACKGROUND OF THE INVENTION

Field of the Invention

The invention relates to a circuit configuration for limiting the output voltage of a clocked voltage regulator or controller, wherein the clocked voltage regulator includes a control unit receiving a direct voltage to be regulated and having an output supplying the output voltage; a voltage regulating amplifier being constructed as an integrator and receiving the output voltage and a reference voltage; a multiplier multiplying the output signal of the voltage regulating amplifier by a signal obtained from the direct voltage to be regulated; a current regulating amplifier receiving the output signal of the multiplier and a signal obtained from the direct voltage to be regulated; and a driver stage converting the output signal of the current regulating amplifier into a trigger signal for the control unit.

A circuit configuration for limiting the output voltage of a clocked voltage regulator is known, for instance, from the publication entitled: Siemens Components 31 (1993), No. 2, p. 46 ff. FIG. 2 on page 48 thereof shows a regulator structure with a multiplier between a voltage and a current regulator. As a result, a curved shape of the input voltage is imposed upon a command or set point value for the current. In that way, an optimal curved shape is attained for the mains current being consumed, even in the partial-load range, and that shape is preserved even if the peak value of the input voltage approaches the output voltage. By using that kind of regulator structure, it is easy to achieve radio interference suppression. However, the voltage regulation must be slow if a power factor as close as possible to 1 is to be obtained, and that causes dynamic voltage overswings at the output which can threaten subsequent components in the circuit.

The literature, in an article by C. Nelson and H. Lemme entitled: "Bessere Schaltnetzteile durch Leistungsfaktor-Korrektur" ["Better SPMSs through Power Factor Correction"], in Elektronik 23/1993, pp. 86–89, discloses a circuit configuration of a clocked voltage regulator using the integrated LT1248 component. Besides the aforementioned circuit configuration, it also includes a voltage regulating amplifier, constructed as an integrator, and forms the point of departure for the invention. However, the circuit requires one additional pin. Moreover, a no-load protection is provided, which causes shutoff of the end stage and can thus cause noise to develop in use.

Other prior art shows various provisions. For instance, the known L6560 component made by SGS Thomson achieves overvoltage detection by ascertaining the current in an integration capacitor. However, that kind of provision offers no no-load protection, and the digital switchoff means for the overvoltage circuit can cause noise to develop in the consumer in the event of overvoltage.

An overvoltage protection circuit made by the company known as Linear Technology is also known, and is realized in its LT1249 component. That circuit offers no-load protection with a comparator to which a reference voltage is supplied. That comparator controls the output signal of the multiplier and monitors a current threshold and the switching performance of the multiplier input. In that kind of configuration, noise can still be produced in the consumer when overvoltage occurs.

All of the aforementioned overvoltage protection circuits essentially have only a simple comparator, which digitally shuts off the driver output, in other words the triggering of the control element, if overvoltage occurs. In such regulators with a fixed operating frequency, that kind of digital overvoltage shutoff intervenes completely asynchronously, with respect to both the operating frequency and the mains frequency. As a result, due to superposition of frequencies, distortion of the input current with a high proportion of harmonics occurs, and that also includes components which are non-harmonic (with respect to the mains frequency). That not only misses the target of sinusoidal power consumption, but components, such as ferrite cores, which are capable of acoustic transmission also cause irritating noise.

U.S. Pat. No. 4,837,495 shows a voltage regulator that is said to have a very good power factor. For that purpose, the voltage regulator operates by the current ramp principle, and it uses a compensation circuit for the current ramp. An integrator is also provided as a voltage regulating amplifier.

SUMMARY OF THE INVENTION

It is accordingly an object of the invention to provide a circuit configuration for limiting the output voltage of a clocked voltage regulator, which overcomes the hereinafore-mentioned disadvantages of the heretofore-known devices of this general type and which is simple in structure.

With the foregoing and other objects in view there is provided, in accordance with the invention, a circuit configuration for limiting an output voltage of a clocked voltage regulator, comprising a control unit receiving a direct voltage to be regulated, and having an output for supplying an output voltage; a voltage regulating amplifier being constructed as an integrator, receiving the output voltage and a reference voltage, and supplying an output signal; a current threshold generator detecting a current intensity of the integrator, and supplying an output signal; a multiplier multiplying the output signal of the current threshold generator by the output signal of the voltage regulating amplifier and a signal obtained from the direct voltage to be regulated, and supplying an output signal; a current regulating amplifier receiving the output signal of the multiplier and a signal obtained from the direct voltage to be regulated, and supplying an output signal; a driver stage converting the output signal of the current regulating amplifier into a trigger signal for the control unit; and a comparator detecting an output voltage of the voltage regulating amplifier, and furnishing a dominant shutoff signal to the control unit if a reference voltage is exceeded.

In accordance with another feature of the invention, the integrator is an operational amplifier having a feedback integration capacitor, the integration capacitor detecting the current.

In accordance with a concomitant feature of the invention, there is provided an operational transconductance amplifier (OTA) receiving the output signal of the current threshold generator supplying an output signal to the multiplier.

It is an advantage of the configuration that only one voltage divider and therefore only one connection pin are needed, which leads to reduced housing costs.

Another advantage is that the circuit can be constructed to be no-load-proof, by adding one additional comparator.

Other features which are considered as characteristic for the invention are set forth in the appended claims.

Although the invention is illustrated and described herein as embodied in a circuit configuration for limiting the output voltage of a clocked voltage regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a schematic and block circuit diagram showing a configuration according to the invention.

DESCRIPTION OF THE PREFEREED EMBODIMENTS

Referring now to the single FIGURE of the drawing in detail, it is seen that reference numerals 1 and 2 indicate input terminals, to which an alternating voltage can be applied. The input terminals 1, 2 are connected to a rectifier unit 3, that has output lines 4 and 5 at which a rectified sinusoidal voltage can be picked up. This voltage is supplied to a control unit 6. An output of the control unit 6 is connected to connection terminals 7 and 8, at which a regulated output voltage can be picked up. Reference numeral 9 indicates a first control input of the control unit 6. The output terminal 7 is connected through a voltage divider 12, 13 to an inverting input of an operational amplifier 10. A reference voltage is supplied through a terminal 11 to a positive input of the operational amplifier 10. An output of the operational amplifier 10 is fed back through a capacitor 14 to the inverting input. The output of the operational amplifier 10 is also interconnected with both a first input of a multiplier 17 and an inverting input of a comparator 18. A non-inverting input of the comparator 18 is interconnected with an input terminal 19 to which a further reference voltage can be supplied. An output of the comparator 18 is connected to a second control input of the control unit 6, and this unit receives a dominant shutoff signal. A second input of the multiplier 17 is interconnected with the line 4. A third input of the multiplier 17 is connected to an output of a driver stage 16, which has an input that is controlled by an output signal of a current threshold generator 15. An input of the current threshold generator 15 is connected to the operational amplifier 10 and ascertains a current that flows through the capacitor 14, for instance through an additional current mirror. An output of the multiplier 17 is connected to a first input of a current regulating amplifier 20. A second input of the current regulating amplifier 20 is interconnected with the line 5. An output signal of the current regulating amplifier 20 is supplied to a driver stage 21. An output signal of the driver stage 21 is connected to the control input 9 of the control unit 6.

A fundamental regulation is performed by way of multiplying an input voltage supplied to the regulator through the line 4, by an output voltage of the operational amplifier 10, which acts as a voltage amplifier and is supplied with and integrates an output voltage of the control unit 6 through the voltage divider 12, 13.

Beyond a certain current intensity in the capacitor 14, the current threshold generator 15 begins to function, and the driver stage 16, which is constructed as a linear amplifier, is activated. This driver stage can preferably be constructed as an operational transconductance amplifier (OTA). An output signal of the operational transconductance amplifier (OTA) serves as an amplitude regulating input signal of the multiplier 17. An output signal of the multiplier 17 then serves to specify the sinusoidal current control. The linear amplifier 16 reduces the multiplier amplification without worsening the power factor. In addition, the comparator 18 is provided, which monitors the output voltage of the operational amplifier 10 for a reference voltage at the terminal 19. This configuration serves as a no-load protection component, and at an output of the comparator 18 it furnishes a dominant shutoff signal, which shuts off the control unit 6 by priority. The no-load protection comparator becomes necessary in the event that offset voltages in the multiplier and in the subsequent current regulator in the circuit are unable to reliably shut off the control unit 6, because the duty factor cannot be set to zero.

We claim:

1. A circuit configuration for limiting an output voltage of a clocked voltage regulator, comprising:

a control unit receiving a direct voltage to be regulated, and having an output for supplying an output voltage;

a voltage regulating amplifier being constructed as an integrator, receiving the output voltage and a reference voltage, and supplying an output signal;

a current threshold generator detecting a current intensity of said integrator, and supplying an output signal;

a multiplier multiplying the output signal of said current threshold generator by the output signal of said voltage regulating amplifier and a signal obtained from the direct voltage to be regulated, and supplying an output signal;

a current regulating amplifier receiving the output signal of said multiplier and a signal obtained from the direct voltage to be regulated, and supplying an output signal;

a driver stage converting the output signal of said current regulating amplifier into a trigger signal for said control unit; and a comparator detecting an output voltage of said voltage regulating amplifier, and furnishing a dominant shutoff signal to said control unit if a reference voltage is exceeded.

2. The circuit configuration according to claim 1, wherein said integrator is an operational amplifier having a feedback integration capacitor, said integration capacitor detecting the current.

3. The circuit configuration according to claim 1, including an operational transconductance amplifier (OTA) receiving the output signal of said current threshold generator supplying an output signal to said multiplier.

* * * * *